United States Patent [19]
Johnson

[11] Patent Number: 5,661,751
[45] Date of Patent: Aug. 26, 1997

[54] SYSTEM AND TECHNIQUE FOR POWER MANAGEMENT OF A UNIVERSAL ASYNCHRONOUS RECEIVER/ TRANSMITTER BY AUTOMATIC CLOCK GATING

[75] Inventor: Scott C. Johnson, Austin, Tex.

[73] Assignee: Advanced Micro Devices, Sunnyvale, Calif.

[21] Appl. No.: 602,261

[22] Filed: Feb. 15, 1996

Related U.S. Application Data

[63] Continuation of Ser. No. 191,388, Feb. 2, 1994, abandoned.

[51] Int. Cl.$^6$ .................................................. H04B 1/38
[52] U.S. Cl. .......................... 375/219; 375/377; 365/227; 365/229
[58] Field of Search ........................... 323/283; 365/227, 365/229, 233; 375/219, 377, 222; 395/750, 250, 286, 559, 872, 873, 874, 875, 876, 877; 370/24; 455/343, 338.3; 312/312; 340/825.2; 327/296, 544

[56] References Cited

U.S. PATENT DOCUMENTS

| | | | |
|---|---|---|---|
| 4,381,552 | 4/1983 | Nocilini et al. | 365/227 |
| 4,665,328 | 5/1987 | Hall . | |
| 4,835,737 | 5/1989 | Herrig et al. . | |
| 4,841,440 | 6/1989 | Yonezu et al. . | |
| 4,851,987 | 7/1989 | Day | 365/227 |
| 4,878,196 | 10/1989 | Rose | 364/900 |
| 4,949,333 | 8/1990 | Gulik et al. | 370/32 |
| 5,167,024 | 11/1992 | Smith et al. . | |
| 5,237,692 | 8/1993 | Raasch et al. . | |
| 5,337,285 | 8/1994 | Ware et al. | 365/227 |

FOREIGN PATENT DOCUMENTS

| | | |
|---|---|---|
| 0 446 519 A3 | 10/1990 | European Pat. Off. . |
| 0 569 131 A3 | 4/1993 | European Pat. Off. . |
| 6051863 | 3/1992 | Japan . |
| WO9100566 | 1/1991 | WIPO . |
| WO92/21081 | 11/1992 | WIPO . |

OTHER PUBLICATIONS

National Semiconductor Corp. PC16550C/NS16550AF, PC16550CF Universal Asynchronous Receiver/Transmitter with FIFOs, pp. 1–20 Jul. 1990.

*Primary Examiner*—Melvin Marcelo
*Assistant Examiner*—Jean B. Corrielus
*Attorney, Agent, or Firm*—Conley, Rose & Tayon, P.C.; B. Noel Kivlin

[57] ABSTRACT

A clock control unit is provided that controls the gating of a clock signal received by an internal baud generator of a universal asynchronous receiver/transmitter (UART) circuit during an active mode. The clock control unit monitors the UART circuit to determine whether the UART is currently idle. If the clock control unit determines that the UART is idle, the clock signal is gated by a synchronous clock gate circuit. Accordingly, the clock signal is not provided to the baud generator, and a corresponding baud rate signal that normally clocks the receiver state machine of the UART is not generated. Power consumption of the UART is thereby significantly reduced. When a certain predetermined system activity is thereafter detected by the clock control unit that indicates a need for activation of the UART, the clock control unit asserts a clock enable signal that causes the synchronous clock gate circuit to pass the clock signal to an input of the baud generator. In one embodiment, the clock control unit causes the clock signal to be degated if the receipt of serial data is detected at the serial input line of the UART, if the receiver state machine is currently active, if the receiver FIFO and buffer register is not empty, if the transmitter FIFO and holding register is not empty, or if the transmitter state machine is active.

17 Claims, 2 Drawing Sheets

SYSTEM AND TECHNIQUE FOR POWER MANAGEMENT OF A UNIVERSAL ASYNCHRONOUS RECEIVER/ TRANSMITTER BY AUTOMATIC CLOCK GATING

This application is a continuation of application Ser. No. 08/191,388, filed Feb. 2, 1994, now abandoned.

BACKGROUND OF THE INVENTION

1. Field of the Invention

This invention relates to serial communication circuits and more particularly to power management techniques employed within asynchronous receiver and transmitter circuits.

2. Description of the Relevant Art

A universal asynchronous receiver and transmitter, commonly abbreviated as a UART, is a prevalently employed communications element within computer systems that allows serial data transmission and reception. A major task of a UART is parallel-to-serial and serial-to-parallel conversion. Briefly speaking, a typical UART includes a pair of shift registers with associated FIFO buffers and control logic. Data to be serially transmitted is loaded into an output shift register, which is clocked at a predetermined bit rate. Start and stop bits are typically inserted that surround each data word during the serial data transmission. Serial data received by the UART is fed into an input shift register, and is clocked at the mid-point of each bit cell. The mid-point of each bit cell is determined by measuring the time relative to the start bit. When a complete word of data is received, the word is transferred into the FIFO buffer in parallel format. When the FIFO buffer is filled to a predetermined capacity, a microprocessor of the computer system is typically interrupted and the data is unloaded from the FIFO buffer.

A typical UART further includes a variety of control and status registers that set and indicate various operating parameters, including the number of data bits, the number of stop bits, the type of parity, the clock divisor, and the status of the internal FIFO buffers. In addition to the basic serial input and output functions, most UART circuits also include connections for modem control handshake signals for RS-232 operation. Details regarding specific UART circuits may be found in a host of publications of the known prior art.

One problem associated with typical UART circuits is that the serial input and output ports usually remain idle for a significant portion of time. During the idle condition of a UART, the receiver state machine which controls the receipt of serial input data is clocked by the internal baud rate generator even though data is not actually being received. The receiver state machine is continuously clocked since the times at which data will be received are usually not known ahead of time. In addition to the receiver state machine, the baud rate generator may also clock other portions of the UART circuit during the idle condition. As a result, power is wasted when the UART is idle since the baud rate signal is unnecessarily being generated and provided to various internal portions of the UART. This is a particular problem when UART circuits are employed within battery-powered portable computer systems.

SUMMARY OF THE INVENTION

The problems outlined above are in large part solved by a system and technique for power management of a universal asynchronous receiver and transmitter by automatic clock gating according to the present invention. In one embodiment, a clock control unit is provided that controls the gating of a clock signal received by an internal baud generator of a universal asynchronous receiver and transmitter (UART) circuit during an active mode. The clock control unit monitors the UART circuit to determine whether the UART is currently idle. If the clock control unit determines that the UART is idle, the clock signal is gated by a synchronous clock gate circuit. Accordingly, the clock signal is not provided to the baud generator, and a corresponding baud rate signal that normally clocks the receiver state machine of the UART is not generated. Power consumption of the UART is thereby significantly reduced. When a certain predetermined system activity is thereafter detected by the clock control unit that indicates a need for activation of the UART, the clock control unit asserts a clock enable signal that causes the synchronous clock gate circuit to pass the clock signal to an input of the baud generator. The baud generator responsively generates the baud rate signal that clocks the receiver state machine as well as other internal portions of the UART. In one embodiment, the clock control unit causes the clock signal to be degated if the receipt of serial data is detected at the serial input line of the UART (i.e., a falling edge of a start bit is detected), if the receiver state machine is currently active, if the receiver FIFO and buffer register is not empty, if the transmitter FIFO and holding register is not empty, or if the transmitter state machine is active. Depending upon the system, the clock control unit may further degate the clock signal if a level change is detected at a modem control line, if reset is active, or if a system cycle is in progress that involves the UART control logic. If none of these predetermined activities is detected by the clock control unit, the clock enable signal is deasserted and the synchronous clock gate circuit responsively gates the clock signal.

Broadly speaking, the present invention contemplates a system comprising an asynchronous receiver and transmitter circuit including a baud generator for generating a baud rate signal, a receiver state machine coupled to the baud generator and capable of receiving serial data at a serial data input line, a transmit state machine coupled to the baud generator and capable of providing serial data at a serial data output line, a first data storage unit coupled to the receiver state machine for storing data received by the receiver state machine in a parallel format, and a second data storage unit coupled to the transmit state machine for storing data to be transmitted by the transmit state machine. A clock gate circuit is also provided having an input line for receiving an external clock signal and an output line for providing a UART clock signal to an input line of the baud generator, wherein the clock gate circuit selectively gates the external clock signal depending upon a clock enable signal. A clock control unit is coupled to the clock gate circuit and to the asynchronous receiver and transmitted circuit which is capable of detecting a predetermined system activity and is capable of asserting the clock enable signal if a predetermined system activity is detected.

The present invention further contemplates a serial communications circuit comprising a baud generator for generating a baud rate signal, a receiver state machine coupled to the baud generator for receiving serial data at a serial data input line, and a transmit state machine coupled to the baud generator capable of providing serial data at a serial data output line. A first data storage unit is also provided that is coupled to the receiver state machine for storing data received by the receiver state machine in a parallel format.

A second data storage unit is further coupled to the transmit state machine for storing data to be transmitted by the transmit state machine. A clock gate circuit having an input line for receiving an external clock input signal and an output line for providing a reference clock signal to the baud generator depending upon a clock enable signal is further provided. A clock control unit is finally provided coupled to the clock gate circuit, wherein the clock control unit is capable of detecting a predetermined system activity and is capable of asserting the clock enable signal if a predetermined system activity is detected.

The present invention finally contemplates a power management method for an asynchronous receiver and transmitter circuit comprising the steps of providing a clock input signal to a clock gate circuit, detecting a predetermined system activity associated with the asynchronous receiver and transmitter, asserting a clock enable signal in response to the detection of a predetermined system activity, providing a clock enable signal to a control line of the clock gate signal to thereby provide a UART clock signal to a baud generator, and deasserting the clock enable signal in response to completion of a predetermined system activity.

BRIEF DESCRIPTION OF THE DRAWINGS

Other objects and advantages of the invention will become apparent upon reading the following detailed description and upon reference to the accompanying drawings in which.

Figure 1:
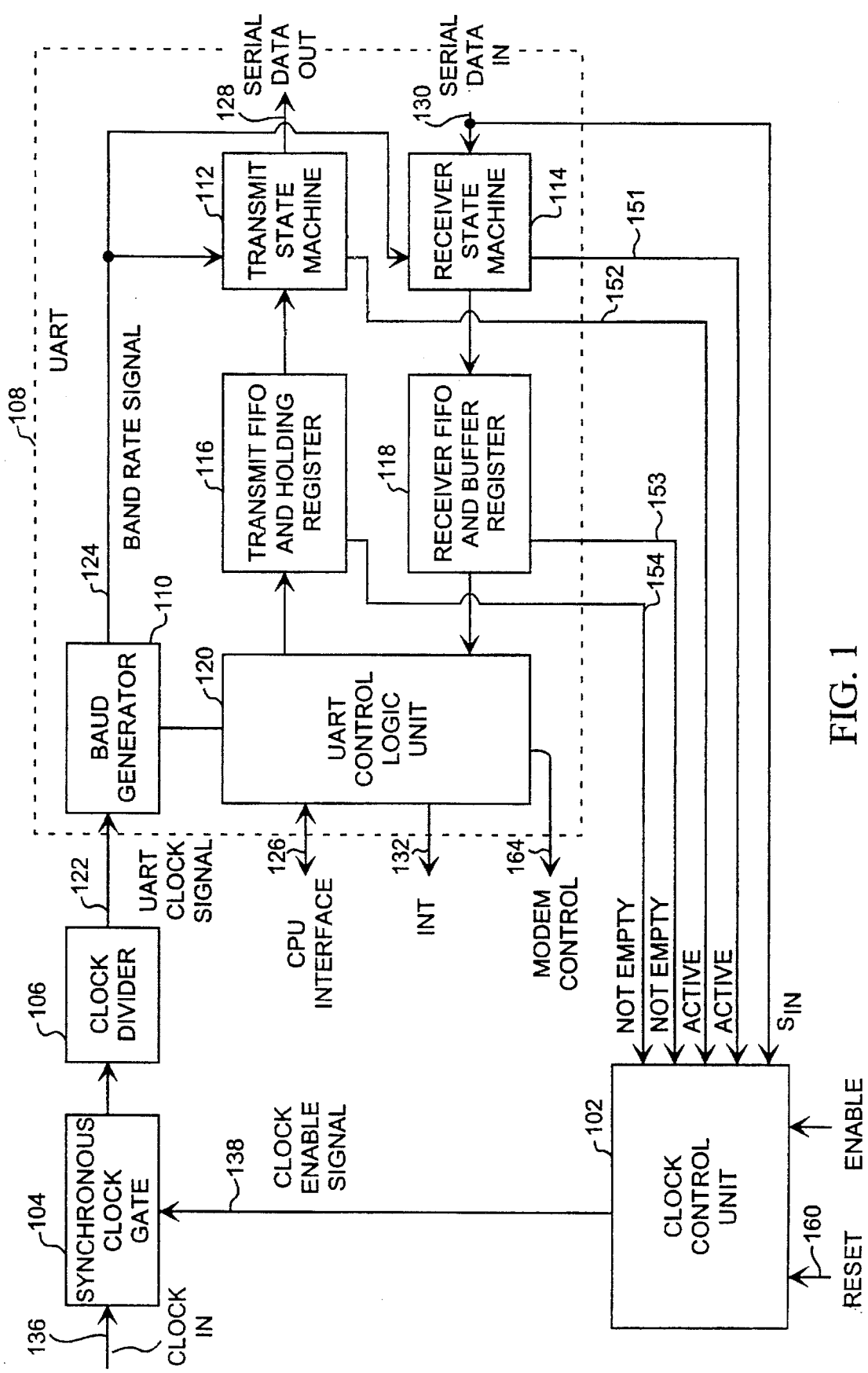
FIG. 1 is a block diagram that illustrates a system for power management of a universal asynchronous receiver/transmitter by automatic clock gating according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 is a block diagram of a system for power management of a universal asynchronous receiver/transmitter by automatic clock gating according to the present invention. The system 100 includes a clock control unit 102, a synchronous clock gate 104, a clock divider unit 106, and a universal asynchronous receiver/transmitter (UART) circuit 108. The UART 108 includes a baud generator 110 coupled to a transmit state machine 112 and to a receiver state machine 114. A transmit FIFO and holding register 116 is coupled to transmit state machine 112, and a receiver FIFO and buffer register unit 118 is coupled to receiver state machine 114. A UART control logic unit 120 is finally coupled to baud generator 110, to transmit FIFO and holding register unit 116, and to receiver FIFO and buffer register unit 118.

With respect to the transmission and receipt of serial data at lines 128 and 130, respectively, the design and operation of baud generator 110, transmit state machine 112, receiver state machine 114, transmit FIFO and holding register 116, and receiver FIFO and buffer register 118 are conventional. Similarly, with respect to the CPU interface at port 126, the design and operation of UART control logic unit 120 are also conventional. In the interest of simplicity and clarity, only a brief description regarding the conventional aspects of UART 108 will be provided below.

During normal operation, baud generator 110 receives a UART clock signal at line 122 and generates a baud rate signal at line 124 having a predetermined frequency. The baud rate signal is coupled to transmit state machine 112 and receiver state machine 114 and provides a timing reference to control the receipt and transmission of serial data.

Parallel data may be provided from an external source to UART 108 via the CPU interface port 126. CPU interface port 126 may be connected to, for example, a CPU local bus or a peripheral bus. Parallel data provided to CPU interface port 126 is passed through UART control logic unit 120 and is stored within transmit FIFO and holding register 116. The parallel data is then transmitted in serial format by the transmit state machine 112 at the serial data output line 128. It is noted that a shift register (not shown) is embodied within transmit state machine 112, and that techniques for achieving the conversion of the parallel data to serial data by transmit state machine 112 are well-known.

Serial data is similarly received by the UART 108 at serial input line 130, and is converted to parallel data by receiver state machine 114. Each word of parallel data from receiver state machine 114 is provided to receiver FIFO and buffer register unit 118. When a certain predetermined number of words have been filled within receiver FIFO and buffer register unit 118, or when, for example, a receiver time-out expires, the UART control logic unit 120 asserts an interrupt signal at line 132 that alerts the microprocessor of the availability of data within the receiver FIFO and buffer register unit 118. In response, the microprocessor sequentially unloads the parallel data from the receiver FIFO and buffer register unit 118.

Details regarding the power management of UART 108 by automatic clock gating according to the present invention are next considered. An input clock signal Clock IN is provided to the synchronous clock gate 104 at line 136. If a clock enable control signal is asserted low at line 138, the Clock IN signal is provided to divider circuit 106 which correspondingly frequency divides the Clock IN signal to thereby derive the UART clock signal at line 122. In one embodiment, the Clock IN signal at line 136 has a frequency of 24 Mhz, and the clock divider circuit 106 is a divide by 13 circuit. Accordingly, the UART clock signal at line 122 has a frequency of 1.8462 Mhz.

As will be understood better from the following description, if the clock control unit 102 determines that the UART 108 is idle and is not currently receiving, processing or transmitting data, the clock enable signal at line 138 is deasserted high such that the Clock IN signal at line 136 is not provided to the clock divider circuit 106, and consequently such that the UART clock signal at line 122 is not generated. By removing the UART clock signal at line 122, the baud rate signal at line 124 is not generated by baud generator 110. As a result, overall power consumption of the UART 108 is decreased when the UART is idle.

The clock control unit 102 is provided to detect various predetermined system activities associated with UART 108 to determine whether the baud rate signal at line 124 must be generated. If the clock control unit determines that the baud rate signal must be generated, it asserts the clock enable signal which causes the synchronous clock gate to degate the Clock IN signal and thereby allows the baud rate signal to be generated. For the embodiment of FIG. 1, the clock control unit 102 asserts the clock enable signal if any one of a variety of system activities are detected. Specifically, the clock control unit monitors the transmit state machine 112, the receiver state machine 114, the transmit FIFO and holding register unit 116, and the receiver FIFO and buffer register unit 118 via lines 151–154. The clock control unit further monitors the serial input line 130. If any one of the following predetermined system activities are detected by the clock control unit 102, the clock enable signal at line 138 is asserted. These predetermined system activities are: the transmit state machine 112 is active, the receiver state machine 114 is active, the transmit FIFO and holding register unit 116 is not empty, the receiver FIFO and buffer register unit 118 is not empty, and a level transition is detected at the serial input line 130. Since each of these predetermined system activities indicates a need for the generation of the baud rate signal at line 124, the clock control unit asserts the clock enable signal upon detection. When the detected activity later completes and is no longer detected by clock control unit 102, and if none of the other predetermined system activities is currently being detected, the clock control unit 102 deasserts the clock enable signal such that the Clock IN signal at line 136 is gated. As stated previously, when the Clock IN signal is gated, a baud rate signal is no longer generated at line 124, and power consumption is reduced.

It is noted that depending upon the particular UART circuit, other predetermined system activities may also be monitored by clock control unit 102 to determine whether the baud rate signal must be generated. For example, in one configuration, the clock control unit monitors a system reset signal at line 160 and causes the clock enable signal to be asserted if an active reset is detected. The baud rate signal must be generated during this situation (when the reset signal is active) since the baud rate signal is necessary for initialization. Similarly, the clock control unit may be configured to detect certain system cycles at CPU interface port 126 if the baud rate signal is necessary to drive the UART control logic unit 120. Finally, the clock control unit may be configured to detect an active modem control signal at line 164 and to responsively assert the clock enable signal.

It is further noted that the deassertion of the clock enable signal by the clock control unit 102 in response to the completion of a detected system activity (as described above) may be delayed by a predetermined amount of time after the system activity completes or is no longer detected. Such a predetermined delay may be desirable to allow the UART 108 to complete operations associated with the detected activity. For example, as stated previously, the clock control unit 102 asserts the clock enable signal when the reset signal becomes active. Subsequently, when the reset signal becomes inactive, the clock control unit 102 may be configured to wait a predetermined time before deasserting the clock enable signal. This may allow, for example, certain initialization operations to complete.

Figure 2:
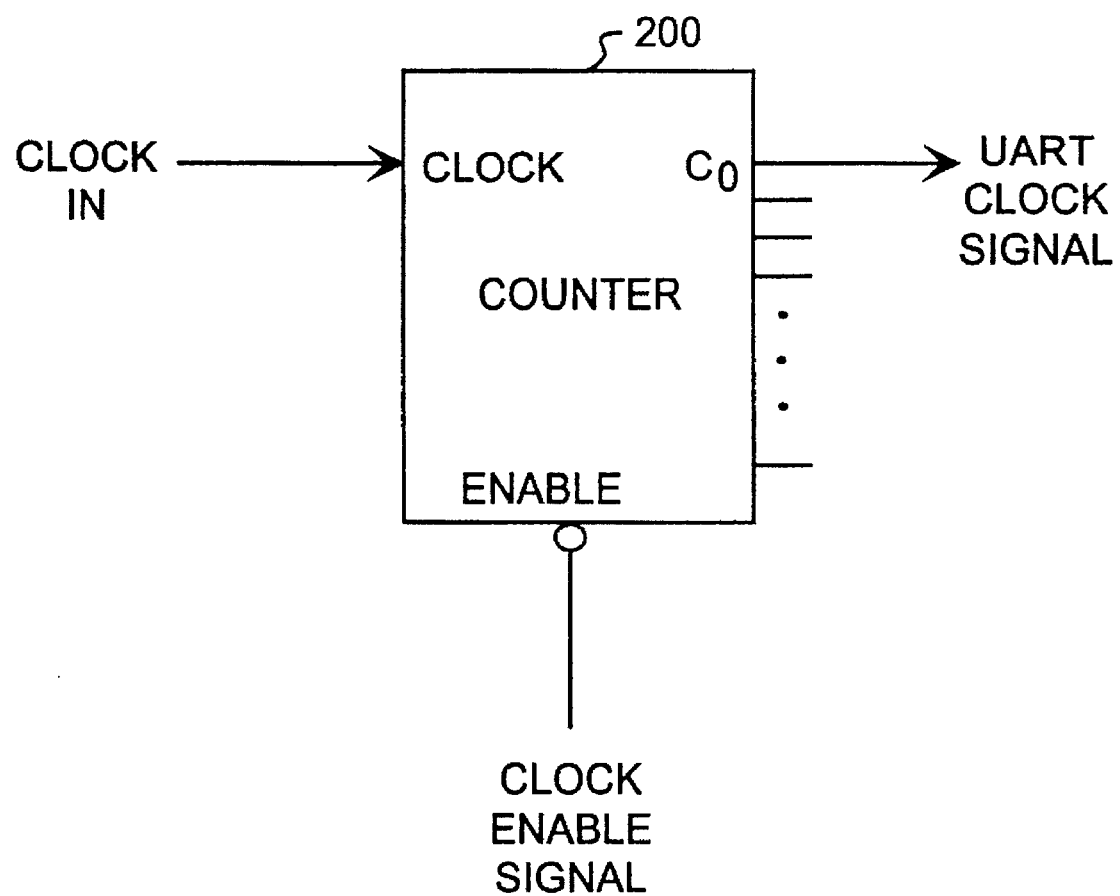
FIG. 2 is a schematic diagram that illustrates a synchronous clock gate and clock divide circuit employed within the system of FIG. 1.

FIG. 2 is a schematic diagram that illustrates an implementation of synchronous clock gate 104 and clock divider unit 106. As illustrated in FIG. 2, a simple counter circuit 200 is employed to implement the synchronous clock gate 104 and clock divider unit 106 of FIG. 1. An input clock signal is provided to a clock input of counter circuit 200, and a divided clock signal is extracted from one of the output lines of the counter circuit 200. The clock enable signal from clock control unit 102 is provided to an enable line of the counter circuit 200. In accordance with the synchronous clock gate and clock divider of FIG. 2, the gating and degating of the Clock IN signal is performed synchronously with respect to the Clock IN signal, and clock "slivers" are thereby avoided.

Referring back to FIG. 1, it is noted that clock control unit 102 may be implemented with combinational logic circuitry, and that the clock control unit 102 may be enabled by an external enable signal. Furthermore, an empty flag associated with transmit FIFO and holding register 116 and an empty flag associated with receiver FIFO and buffer register 118 may be used to derive the monitored signals at lines 153 and 154.

It is noted that in a further embodiment, clock control unit 102 may monitor a time-out counter associated with receiver FIFO and buffer register unit 118. As is known to those of skill in the art, such a time-out counter may be employed within a typical UART to cause an interrupt signal to be asserted to the microprocessor if data is held by the receiver FIFO 118 for a time duration that exceeds a time-out counter period. For such an embodiment, the clock control unit 102 asserts the clock enable signal during the time at which the time-out counter of receiver FIFO and buffer register 118 is active. When the count period of the time-out counter expires, the clock control unit 102 deasserts the clock enable signal such that the baud rate signal is no longer generated even if data is still contained within the receiver FIFO and buffer register unit 118. Following the deassertion of the clock enable signal, the microprocessor may unload the data from receiver FIFO and buffer register unit 118.

It is further noted that the transmit FIFO and holding register unit 116 and the receiver FIFO and buffer register 118 may each be implemented using any type of data storage units. For example, the transmit FIFO and holding register unit 116 as described above may include a multi-byte storage FIFO, or only a single-byte storage register. Similarly, receiver FIFO and buffer register unit 118 may include a multi-byte storage FIFO, or only a single-byte storage register.

Numerous variations and modifications will become apparent to those skilled in the art once the above disclosure is fully appreciated. For example, the specific circuitry used to implement the internal subunits of UART 108 may vary depending upon the requirements of a particular application. Furthermore, the predetermined system activities that are detected by clock control unit 102 may vary depending upon the particular UART circuit employed. In that regard, system activities in addition to those indicated above may be detected by clock control unit 102 and cause the clock enable signal to be asserted. It is intended that the following claims be interpreted to embrace all such variations and modifications.

What is claimed is:

1. A system comprising:
   an asynchronous receiver and transmitter circuit including:
      a baud generator for generating a baud rate signal;
      a receiver state machine coupled to said baud generator and capable of receiving serial data at a serial data input line;
      a transmit state machine coupled to said baud generator and capable of providing serial data at a serial data output line;
      a first data storage unit coupled to said receiver state machine for storing data received by said receiver state machine in a parallel format; and
      a second data storage unit coupled to said transmit state machine for storing data to be transmitted by said transmit state machine;

a clock gate circuit having an input line for receiving an external clock signal and an output line for providing a UART clock signal to an input line of said baud generator, wherein said clock gate circuit selectively gates said external clock signal depending upon a clock enable signal; and a clock control unit coupled to said clock gate circuit, to said input line of said receiver state machine, and to said first data storage unit, wherein said clock control unit is capable of detecting a signal transition at said serial data input line and of detecting when said first data storage unit is empty, and wherein said clock control unit is configured to drive said clock enable signal in response to a detection of said signal transition at said serial data input line such that said UART clock signal is provided to said input line of said baud generator from said clock gate circuit, and wherein said clock control unit is further configured to drive said clock enable signal such that said UART clock signal is removed from said input line of said baud generator after detecting that said first data storage unit is empty.

2. The clock control unit as recited in claim 1 wherein said clock control unit is coupled to said receiver state machine, wherein said clock control unit is further capable of detecting an active state of said receiver state machine that is indicative of serial data being received by said asynchronous receiver and transmitter circuit, and of driving said clock enable signal if said active state of said receiver state machine is detected.

3. The system as recited in claim 1 wherein said asynchronous receiver and transmitter circuit further includes a control logic unit coupled to said first and second data storage units for controlling data transfers between a microprocessor and said asynchronous receiver and transmitter circuit.

4. The system as recited in claim 1 wherein said first data storage unit includes a FIFO buffer.

5. The system as recited in claim 1 further comprising a clock divider circuit connected between said clock gate circuit and said baud generator, wherein said clock gate circuit selectively provides said external clock signal to said divider circuit and wherein said divider circuit generates said UART clock signal.

6. The system as recited in claim 5 wherein said clock gate circuit and said clock divider are implemented with a counter circuit.

7. The system as recited in claim 1 wherein said clock gate circuit is configured such that said UART clock signal is synchronous with said external clock signal.

8. The system as recited in claim 1 wherein said clock control unit is connected to said transmit state machine, and wherein said clock control unit is further capable of detecting an active state of said transmit state machine that is indicative of serial data being transmitted by said synchronous receiver and transmitter circuit, and of driving said clock enable signal, such that said clock gate circuit provides said UART clock signal to said input line of said baud generator, if said active state of said transmit state machine is detected.

9. The system as recited in claim 1 wherein said clock control unit drives said clock enable signal when no signal transitions at said serial data input line are detected and said first data storage unit is empty, such that said clock gate circuit does not provide said UART clock signal to said input line of said baud generator.

10. The system as recited in claim 9 wherein said clock control unit changes a logical state of said clock enable signal a predetermined time delay after no signal transitions at said serial data input line are detected and said first data storage unit is empty, such that said clock gate circuit does not provide said UART clock signal to said input line of said baud generator.

11. A serial communications circuit comprising:

a baud generator for generating a baud rate signal;

a receiver state machine coupled to said baud generator for receiving serial data at a serial data input line;

a transmit state machine coupled to said baud generator capable of providing serial data at a serial data output line;

a first data storage unit coupled to said receiver state machine for storing data received by said receiver state machine in a parallel format;

a second data storage unit coupled to said transmit state machine for storing data to be transmitted by said transmit state machine;

a clock gate circuit having an input line for receiving an external clock input signal and an output line for providing a reference clock signal to said baud generator, wherein said clock gate circuit selectively gates said external clock signal depending upon a clock enable signal; and a clock control unit coupled to said clock gate circuit, to said input line of said receiver state machine, and to said first data storage unit, wherein said clock control unit is capable of detecting a signal transition at said serial data input line and of detecting when said first data storage unit is empty, and wherein said clock control unit is configured to drive said clock enable signal in response to a detection of said signal transition at said serial data input line such that said reference clock signal is provided to said input line of said baud generator from said clock gate circuit, and wherein said clock control unit is further configured to drive said clock enable signal such that said reference clock signal is removed from said input line of said baud generator after detecting that said first data storage unit is empty.

12. The serial communications circuit as recited in claim 4 wherein said clock control unit is coupled to said receiver state machine, wherein said clock control unit is further capable of detecting an active state of said receiver state machine that is indicative of serial data being received by said serial communications circuit, and of driving said clock enable signal if said active state of said receiver state machine is detected.

13. The serial communications circuit as recited in claim 11 wherein said clock control unit drives said clock enable signal when no signal transitions at said serial data input line are detected and said first data storage unit is empty, such that said clock gate circuit does not provide said reference clock signal to said input line of said baud generator.

14. The serial communications circuit as recited in claim 11 wherein said clock control unit drives said clock enable signal a predetermined time delay after no signal transitions at said serial data input line are detected and said first data storage unit is empty, such that said clock gate circuit does not provide said reference clock signal to said input line of said baud generator.

15. The serial communications circuit as recited in claim 11 wherein said first data storage unit includes a FIFO buffer coupled to said receiver state machine.

16. The serial communications circuit as recited in claim 11 wherein said second data storage unit includes a FIFO buffer coupled to said transmit state machine.

17. The serial communications circuit as recited in claim 11 wherein said clock gate circuit is configured such that said reference clock signal is synchronous with said external clock signal.

* * * * *